July 16, 1968          R. C. VICKERY ETAL         3,393,372
       CARBON DIOXIDE LASER SYSTEMS FOR THE EMISSION
                   OF COHERENT RADIATON
                    Filed Oct. 26, 1967
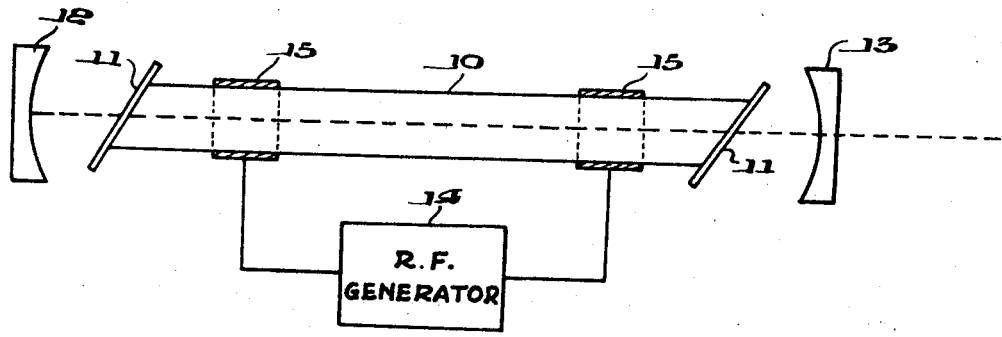
                              INVENTORS.
                          RONALD C. VICKERY,
                      BY  JOSEPH V. FISHER.
                          their
                          ATTORNEY.

United States Patent Office 3,393,372
Patented July 16, 1968

3,393,372
CARBON DIOXIDE LASER SYSTEMS FOR THE
EMISSION OF COHERENT RADIATION
Ronald C. Vickery, East Norwich, N.Y., and Joseph V.
Fisher, Valencia, Pa., assignors of one-fourth to Joseph
V. Fisher, Valencia, and three-fourths to Semi-Elements,
Inc., Saxonburg, Pa., a corporation of Pennsylvania
Continuation-in-part of application Ser. No. 243,835,
Dec. 11, 1962. This application Oct. 26, 1967, Ser.
No. 678,395
11 Claims. (Cl. 331—94.5)

ABSTRACT OF THE DISCLOSURE

Gaseous optical lasers containing a mixture of gases, at least one of which is a gaseous compound of carbon and oxygen, particularly carbon dioxide. The mixture may also contain a noble gas selected from the group consisting of argon, helium, neon, krypton and xenon.

Cross-references to related applications

This application is a continuation-in-part of copending application Ser. No. 243,835, now abandoned filed Dec. 11, 1962 and assigned to the assignee of the present application.

Background of the invention

Two basic means for the emission of coherent radiation are currently known. In one, customarily utilized in the solid state, electron population inversion is obtained by optical pumping of paramagnetic ions held in a diluent matrix. As these ions revert to their normal energy level, or ground state, they emit energy in the form of light at light waves corresponding to the electron shell levels between which transition takes place. The relationship is:

$$1/\lambda = \frac{2\pi^2 me^4}{ch^3}(1/n_2 - 1/n_1)$$

where $\lambda$ = wavelength of the emitted light in angstroms
$m$ = gas mass number
$e$ = electronic charge
$c$ = velocity of light
$h$ = Planck's constant
$n_1$ = lower energy level
$n_2$ = higher energy level The emitted radiation is resonated in the medium by internal reflection from appropriately coated mirrors, one of the mirrors being totally reflecting and the other being partially reflective, on the order of 98% reflective. In resonance passage, the energy developed grows by accretion until it is emitted as a beam of coherent radiation through the partially reflective mirror.

The other means for production of such laser beams has previously been confined to gas lasers involving reactions developed in systems of mixtures of noble-noble or noble-oxygen gases. Such systems are described, for example, in U.S. Patent Nos. 3,149,290 and 3,159,707. In accordance with the teachings of the aforesaid patents, laser action is produced in mixtures of the noble gases helium, neon, argon, krypton and xenon with or without the non-noble gas oxygen. Under radio-frequency discharge conditions, such gaseous mixtures undergo quasi-resonant transfer of energy from noble gas metastables to repulsive neutral exicted states of the oxygen molecule. In neon-oxygen, argon-oxygen, helium-neon and the like mixtures, for example, optical maser oscillations have led to the emission of continuous beams of coherent radiation at wavelengths varying from 0.63 micron to 2.03 microns.

Summary of the invention

As one object, the present invention seeks to provide a system for the generation of coherent beams of radiation.

As another object, the present invention seeks to provide a new and improved gas laser system comprising a generally cylindrical tube containing a mixture of noble and non-noble gases, the noble gas being selected from the group consisting of argon, helium, neon, krypton and xenon, and the non-noble gas consisting of a compound of carbon and oxygen, particularly carbon dioxide.

Another object of the invention is to provide a gaseous laser system capable of producing various emitted light frequencies, including light frequencies in the ultraviolet range.

In accordance with the invention, it has been found that replacement of the oxygen component of a gas mixture such as neon-oxygen or argon-oxygen by, for example, carbon dioxide creates a wide range of output radiation frequencies at higher output powers and greater efficiencies than heretofore known. In carrying out the invention, gases such as nitrogen can be added to the basic mixture of carbon dioxide with any one or more of argon, helium, neon, xenon or krypton. The essential constituent for achieving the improved results of the invention is carbon dioxide. This may dissociate into carbon monoxide under the influence of electrical excitation. Accordingly, as used herein the term "gas consisting of a compound of carbon and oxygen" is intended to mean carbon dioxide and carbon monoxide.

For a better understanding of the nature and objects of the invention, reference may be had to the following detailed description, taken in connection with the accompanying drawing, in which the single figure is a diagrammatic view of a gas filled device embodying the principal features of the invention.

Referring now to the drawing, the device shown therein comprises a tube 10, preferably composed of quartz, and having windows 11 at the ends thereof sealed at the appropriate Brewster angle. As is known, the Brewster angle windows decrease reflective losses and permit a higher gain per pass of the light beam, resulting in higher power output.

A mirror 12 is mounted externally of the tube at its left end; while a similar mirror 13 is externally mounted at the right end of the tube. The mirrors are preferably coated so as to provide maximum reflectance at the emitted wavelength, although broad-band mirrors may be utilized if it is desired to obtain possibly more than one emitted frequency. The mirror 13 is not entirely reflective to provide a transmittance of approximately 2%. The mirrors are desirably separated by a distance equal to an even multiple of the wavelength which it is desired to amplify, thereby providing the desired resonant cavity effect.

As explained hereinbefore, the tubes of prior gaseous lasers have been filled with neon-oxygen, argon-oxygen, helium-neon and other mixtures of noble-noble or noble-oxygen gases. When a tube filled with one of the foregoing gas mixtures is excited by means of a raido frequency generator 14, which is connected to conducting bands 15 disposed around the tube, the emission of continuous beams of coherent radiation is achieved.

It has now been found that by replacing the oxygen component of the gas mixture by a gas such as carbon dioxide, coherent radiation can also be obtained. Thus, when a gas mixture of argon-carbon dioxide (9%–90% argon, 10%–91% carbon dioxide) is introduced into an evacuated glass or quartz cylinder, such as the tube 10, and the system is excited by a radio-frequency discharge at 230 megacycles frequency, coherent beams of radiation can be obtained at about 2900 Angstrom units, 8000 to 9000 Angstrom units and 10,000 to 15,000 Angstrom units. The gas mixture pressure in this specific example was 0.5 millimeter of mercury, however it has been found possible to obtain laser oscillation at pressures as high as 5 millimeters of mercury. In this instance, it is thought that quasi-resonant energy transfer involved not only the argon-carbon dioxide excited states, but also that of carbon monoxide derived from momentary dissociation of the dioxide. However, there should be no restriction to this explanation of the phenomenon.

The gas argon can be replaced by helium, neon, krypton, xenon or mixtures of these, with or without argon. For example, a mixture of 90% helium and 10% carbon dioxide at a pressure of 0.5 millimeter of mercury will emit frequencies at about 3000 Angstrom units, 8000 to 9000 Angstrom units and at about 10,000 to 15,000 Angstrom units. Similarly, a mixture of 90% neon by volume with 10% carbon dioxide by volume at a pressure of about 0.5 millimeter of mercury emits frequencies at about 3000 Angstrom units, 8000 to 9000 Angstrom units and 10,000 to 15,000 Angstrom units. A mixture of 81% helium, 9% neon and 10% carbon dioxide at a pressure of about 0.5 millimeter of mercury emits frequencies at 3000 Angstrom units, 6000 Angstrom units and 8000 to 9000 Angstrom units. Similar results can be obtained with mixtures of xenon and/or kryton with carbon dioxide.

While the foregoing experiments were carried out under continuous radio-frequency excitation, it should be understood that pulsed excitation of the emitting gas can be used with equal effectiveness rather than continuous wave excitation. In this latter case, the conducting bands 15 are replaced by electrodes which extend into the interior of the tube 10 itself; and a pulsed source of electrical energy is applied across the electrodes in accordance with well-known techniques.

If it is desired to obtain emitted light frequencies in the ultraviolet range with continuous radio-frequency excitation, care must be taken to fit the bands 15 snugly around the tube 10. At a radio-frequency discharge of 230 megacycles per second, the power input to the system should be in excess of 300 watts and preferably in excess of 500 watts, and the reflectivity of the totally reflecting mirror 12 should be 99% or better. For pulsed excitation, the reflectivity of the mirrors need not be so high.

The carbon dioxide mentioned above can be replaced by nitrogen, hydrogen, ammonia or mixtures of these with carbon dioxide such as a carbon dioxide-nitrogen-noble gas mixture.

From the foregoing, it is apparent that systems for the generation of coherent beams of radiation can be provided by utilizing mixtures of gases at least one of which is preferably carbon dioxide but including hydrogen, nitrogen and ammonia or mixtures of these, and also preferably including one or more of the noble gases helium, neon, argon, krypton or xenon. In all cases, the essential gas is carbon dioxide which, as mentioned above, may dissociate into carbon monoxide. The gas mixtures may be contained in a transparent cylindrical tube at low pressures and excited by a radio-frequency discharge, the emitted energy being resonated by appropriately placed planar or spherical mirrors which are either internal or external to the excitation tube.

Since numerous changes may be made in the above-described construction, and different embodiments of the invention may be made without departing from the spirit and scope thereof, it is intended that all the matter contained in the foregoing description or shown in the accompanying drawing shall be interpreted as illustrative and not in a limiting sense.

We claim as our invention:

1. In a system for the generation of coherent beams of radiation, in combination, a tube containing a mixture of at least one noble and non-noble gas, the noble gas being selected from the group consisting of argon, helium, neon, krypton and xenon, the non-noble gas comprising carbon dioxide, means for exciting the gas mixture by electrical energy, and mirrors oppositely disposed at the ends of the tube for resonating energy emitted from the gas mixture, one of the mirrors being substantially totally reflecting and the other being partially reflecting only whereby light can be emitted from the tube through said partially reflecting mirror.

2. The system of claim 1 wherein the electrical energy comprises radio-frequency wave energy.

3. The system of claim 1 wherein the noble gas comprises argon.

4. The system of claim 1 wherein the noble gas comprises helium.

5. The system of claim 1 wherein the noble gas comprises neon.

6. The system of claim 1 wherein the noble gas comprises krypton.

7. The system of claim 1 wherein the noble gas comprises xenon.

8. In a system for the generation of coherent beams of radiation, in combinaation, a tube containing a gas mixture consisting essentially of argon and carbon dioxide, means for exciting the gas mixture by radio-frequency wave energy, and mirrors oppositely disposed at the ends of the tube for resonating energy emitted from the gas mixture, one of said mirrors being substantially totally reflecting and the other being partially reflecting only.

9. The system of claim 8 wherein the gas mixture comprises 9%–90% argon by volume and 10%–91% carbon dioxide by volume.

10. The system of claim 8 wherein the pressure of the gas mixture within said tube is below about 5 millimeters of mercury.

11. In a system for the generation of coherent beams of radiation, in combination, an enclosure containing a mixture of gases at least one of which comprises carbon dioxide and at least another of which comprises a noble gas, means for exciting the gas mixture by electrical energy, and mirrors oppositely disposed at the ends of the enclosure for resonating energy emitted from the gas mixture.

References Cited

Boot "Pulsed Gaseous Maser," Nature, vol. 197, No. 4863, pp. 173–174, Jan. 12, 1963, Q–1–N2.

Patel "Flowing-Gas Laser Achieves High Efficiency, High Output," Laser Focus, vol. 1, No. 13, p. 9, July 1, 1965.

Tien et al. "$CO_2$ Laser Develops 183-Watt Continuous Output," Laser Focus, vol. 1, No. 24, pp. 15–16, Dec. 15, 1965.

JEWELL H. PEDERSEN, *Primary Examiner.*

RONALD L. WIBERT, *Examiner.*